United States Patent [19]

Rivkin et al.

[11] 4,156,530
[45] May 29, 1979

[54] SEALED ASSEMBLY

[75] Inventors: Solomon L. Rivkin; Alexandr Y. Levin; Leonid B. Izrailevsky; Alexandr F. Stepchenko; Konstantin G. Kharitonov; Nikolai A. Chuikin, all of Moscow, U.S.S.R.

[73] Assignee: Vsesojuzny Teplotekhnichesky Nauchnoissledovatelsky Institut Imeni F. E. Dzerzhinskogo, Moscow, U.S.S.R.

[21] Appl. No.: 663,084

[22] Filed: Mar. 2, 1976

[51] Int. Cl.$^2$ .............................................. F16J 15/40
[52] U.S. Cl. .................................................. 277/135
[58] Field of Search .............. 277/135, 13, 14 R, 14 U

[56] References Cited

U.S. PATENT DOCUMENTS 2,262,687  11/1941  Little ..................................... 277/135

FOREIGN PATENT DOCUMENTS 28813 of  1912  United Kingdom ..................... 277/135
1101930  2/1968  United Kingdom ..................... 277/135

*Primary Examiner*—Robert I. Smith
*Attorney, Agent, or Firm*—Fleit & Jacobson

[57] ABSTRACT

A sealed assembly of two cooperating movable or stationary parts with a gap separating different-pressure media, which comprises at least one recess formed in one of said parts to accommodate a liquid seal, said recess communicating with said gap, and a polycapillary lock formed as a compressed fine-grained packing accommodated in at least one of said recesses in communicating relationship with said seal, the packing and the parts being constructed from a material resistant to wetting by the seal.

The sealed assembly of the invention is a simple and reliable means of sealing heavy-duty equipment with high-parameter media employed in power engineering, metallurgy, chemical industry and other branches.

Provision is made for sealing assemblies arbitrarily positioned in space and for high-speed shafts.

2 Claims, 10 Drawing Figures

SEALED ASSEMBLY

The present invention relates to sealed assemblies of equipment employed in power engineering, metallurgy, chemical industry and other industrial branches.

Such as assembly of a machine or other piece of equipment generally comprises two cooperating parts movable or stationary one with respect to the other and having a gap therebetween separating different-pressure media. Flanged joints, rods and shafts in guide bushes are typical assemblies of the type in question.

Sealing of such an assembly invariably aims at preventing the overflowing of the media through the gap between the parts toward lower pressure by use of a variety of sealing means, primarily packing glands. The latter, however, apart from calling for constant monitoring with periodic tightening and replacement of the packing material, fail to provide for the required level of sealing reliability, particularly in high-temperature and pressure environments.

Leakage of the medium, however insignificant, is undesirable in many industries, inter alia, in the primary circuit of nuclear power plants, calling for absolutely hermetic seals. It is common knowledge that a hydraulic seal, i.e. a column of liquid whose weight counterbalances the pressure of the medium being sealed, is an example of such a hermetic seal. It is likewise known in the art to employ so-called magnetic liquids held in the gap to be sealed with the aid of a magnetic field. However, though providing for absolute tightness, these known seals can only withstand, given the currently used equipment sizes, very small pressure drops, on the order of fractions of an atmosphere.

It has been recently known to employ hermetic seals on the frozen-gland principle. Thus, U.S. Pat. No. 3,129,947, Cl. 277-22, granted in 1964, describes a seal of this latter kind for the equipment making up liquid, metal circuits. The molten metal is sealed in the gap by freezing the seal locally using means which maintain part of the metal at a temperature below its melting point. The rest of the metal which is immediately adjacent the cold fraction must be maintained at a temperature exceeding the melting point. The molten metal which experiences the pressure exerted by the working medium cannot break through the gap and solidifies in the zone being cooled.

Another U.S. Pat. No. 3,554,558, Cl. 277-18, granted in 1971 describes a sealed assembly which uses the same principle but, as distinct from the former assembly, permits employing a working medium different from the sealing material. This is achieved by communicating the gap to be sealed with a source of a sealing liquid which is fed into the gap at a pressure excessive with respect to the media separated by the gap. In this assembly, there are provided means for heating the gap at the point of sealing liquid supply to maintain same in the liquid state, as well as means for cooling the gap on both sides of the liquid portion of the seal in order to create cold sealing plugs.

Both foregoing types of seals are equivalent to the hydraulic seal in terms of tightness, but, as distinct from the hydraulic seal, they are capable of withstanding considerable pressure drops and high temperatures.

However, the advantages of the above-described known types of seals go hand in hand with substantial disadvantages which severely limit their applicability. Thus, they create sharp temperature gradients adversely affecting the strength of the metal parts; their design is too sophisticated to be practicable, what with the special heater and cooling devices required; they are not reliable enough, since any emergency deenergizing of the heater and/or refrigerators immediately entails a seal failure. Furthermore, seals of this kind consume power even under idling conditions when the working medium has the same temperature as the environment but is maintained at a pressure excessive with respect thereto.

Still another disadvantage of the known sealed assemblies with a locally frozen seal consists in that the cooperating parts can move one with respect to the other at a relatively small speed limited by the melting of the frozen seal portion adjoining the movable part due to the heat of friction.

It is also known in the art to employ assemblies which are sealed by means of a liquid held by the surface tension forces either in the gap being sealed or in a polycapillary lock constructed from a material resistant to wetting by the sealing liquid. Assemblies of this latter kind are employed, inter alia, for sealing the sites of passage of thin wire moving through a special reactor to be coated therein with a vaporous medium (see: U.S. Pat. Nos. 3,669,065; 3,731,651 and 3,738,314, Cl. 118-49.5, granted in 1973).

The standard sealing liquid in such assemblies is mercury and the lock is formed as a molybdenum wire cage. This seal uses the well-known capillary effect, whereby the surface layer of liquid in narrow cylindrical channels (capillaries) or constant-width narrow slots gets warped due to surface tension, forming a meniscus which is concave when the liquid wets the walls of the capillary, and convex in the absence of the wetting effect. According to Laplace's formula known from theoretical physics, the meniscus in the capillary exerts additional pressure on the surface of the liquid, said pressure being directed inwards if the meniscus is convex and outwards if it is concave.

The magnitude of this pressure is found from the formula:

$$P_m = \sigma(1/R_1 + 1/R_2), \qquad (1)$$

where $P_m$ is the pressure determined by the curvature of the meniscus;

$\sigma$ is the surface tension;

$R_1$ and $R_2$ are radii of curvature of the meniscus.

For a cylindrical capillary it can be assumed that $R_1 = R_2 = d/2$, where d is the internal diameter; for a ring slit one of the radii tends to infinity while the other one can be assumed to be equal to half the width of the slit $S/2$. Accordingly, the expressions for the meniscus pressure as applied to a single cylindrical capillary and a single ring capillary can be represented as follows:

$$P_m^0 = 4\sigma/d, \qquad (2)$$

$$P_m^\cdot = 2\sigma/S. \qquad (3)$$

The surface pressure of the convex meniscus is used to mount a locking force preventing ejection of the medium being sealed from the gap between the assembly components. Such a meniscus may be formed by supplying into the gap a liquid which fails to wet the material from which are constructed the assembly components. But to achieve this effect, as shown by calculations on the basis of the above formulas, the size of the gap must be approximately 0.01 mm if the meniscus pressure is to be on the order of only one atmosphere.

This pressure is sufficient to seal the sites of passage of thin wire being drawn through a reactor to be coated therein, in accordance with the above-mentioned U.S. Pat. Nos. 3,669,065; 3,731,651 and 3,738,314, since the clearance between the wire and the walls of the hole may be very small to allow the wire to pass, and the vapour pressure in the reactor is insignificant. The mercury placed in the wire cage (U.S. Pat. No. 3,738,314) experiences no pressure drop at all, and the surface tension in the cage elements counteracts only the mercury's own weight.

The latter type of seal is attractive in that it ensures complete tightness without recourse to heaters or refrigerators. However, the embodiments of the assemblies described in said patents cannot provide for the tightness of parts cooperating along a long perimeter, high-speed parts, or assemblies arbitrarily oriented in space. Furthermore, said embodiments are not adapted to withstand high pressure and temperature differentials typical of modern power equipment. Thus, at a working medium pressure of around 10 to 30 Mpa characteristic of such equipment, the gap between the assembly components or the effective diameter of the lock capillaries (in this case the effective diameter is the representative diameter of an irregular-shape hole equal to its least bore) must be on the order of one-tenth of a micron, a size unattainable by the means provided for in the above patents.

It is a cardinal object of the present invention to provide a simple, efficient and reliable sealed assembly for high-parameter media.

It is another important object of the invention to ensure that the assembly will not lose its tightness when the assembly occupies an arbitrary spatial position.

It is yet another important object of the invention to provide for a high level of assembly tightness at high speeds of relative motion of the components thereof, in the first instance, as applied to the high-speed shafts of turbines, pumps and other like mechanisms.

The foregoing and other objects are attained, in accordance with the invention, in an assembly which comprises two cooperating parts with an annular gap therebetween separating different-pressure media, with a recess formed in at least one of said parts, opening into said gap and disposed in concentric relationship therewith; one of said recesses accommodates a sealing liquid and at least one of said recesses (if there is only one recess, then the same as that accommodating the seal) accommodates, on the side of the lower-pressure medium, a polycapillary lock formed as a fine-grained packing maintained in contact with said seal, the material of said packing, just as the material from which said parts are constructed, being nonwettable by said sealing liquid (the assembly parts must be non-wettable at least at the junction with said packing). Besides, in accordance with the invention, the proposed assembly incorporates means for compressing at least said packing in said recesses.

In the proposed assembly the sealing liquid is held in the lock by the surface tension forces, just as it is in the assembly described in e.g. said U.S. Pat. No. 3,738,314. But the compressed fine-grained packing employed as the polycapillary lock in the assembly of the present invention permits meeting the requirements inherent in the cardinal object of this invention, since, while affording a simple design solution, the compressed packing provides for a sufficiently fine capillary structure (which can be controlled by varying the degree of compression) and also densely packs the space between the cooperating assembly components, preventing the seal from breaking through the gap even at high values of the pressure drop (on the order of hundreds of atmospheres, or scores of megapascals).

The present invention offers some embodiments of the proposed assembly, whereby the other important objects described hereabove can be attained as well as further objects to be dealt with hereinafter in the course of the description that follows.

Thus, there is provided an embodiment of the proposed assembly, wherein said sealing liquid is made of a material selected from the group consisting of low-melting metals such as tin or Wood's alloy, and the fine-grained packing is constituted by graphite powder. These materials satisfy the above-mentioned requirements as applied to the media and operating conditions of the power equipment employed at modern thermal and nuclear power plants. The seal made of said materials has a melting point of some 200° C., i.e. below the temperature of the working medium, and fails to wet steel, a common structural material in today's power engineering. The graphite powder is also non-wettable by molten metals, inert and resistant to high temperatures.

A further embodiment of the assembly in accordance with the present invention includes said fine-grained packing composed of at least two layers, with the grain size progressively increasing towards the lower-pressure medium, thereby providing a sufficiently large mounting clearance between the assembly components without any risk that small grains will be carried out of the gap.

Another embodiment of the assembly in accordance with the invention uses a seal constituted by a heterogeneous diphase mixture of a molten material selected from the group consisting of tin and Wood's alloy with a solid material having a fine-grained structure and subject to wetting by the foregoing melt. Such a mixture has a higher effective surface tension than a pure melt, thereby allowing of somewhat reducing the requirements to the fineness of the capillary structure of the packing and to the force with which it is to be pressed against the recess walls. Said fine-grained solid material may be employed either as a powder or in a sintered form, constituting a sort of a sponge impregnated with the molten metal.

Yet another embodiment of the assembly in accordance with the invention employes bronze as said solid material, bronze being wettable by tin, Wood's alloy and other like materials and having a sufficiently high melting point to stay solid at the working temperature of the medium being sealed in power equipment.

Still another embodiment of the assembly in accordance with the invention relates to the sealing of a stationary joint, inter alia, a flanged joint. In accordance with this embodiment, the means for compressing said packing in said recesses is represented by annular projections equidistant with respect to said recesses and formed in the assembly components opposite thereto.

A further embodiment of the assembly in accordance with the invention relates to a horizontal flanged joint, wherein one common recess for said packing and said seal is provided in the lower flange, said recess being wider than an annular projection disposed on the upper flange and serving as a means of compressing said packing, and said projection adjoins the wall of said recess facing towards the lower-pressure medium by way of one side thereof, whereas the other side of said projection has an annular lip, and said packing is disposed on the surface of said seal in the portion of said recess defined by said lip and the wall of the recess which faces towards the lower-pressure medium, the surface of said seal in the rest of said recess lying above the lower edge of said lip. This sets up a hydraulic seal, preventing immediate contact of the medium being sealed with said packing.

Another embodiment of the assembly in accordance with the invention, as applied to a flanged joint with the flanges disposed vertically, is characterized in that it has two recesses, one for said seal and the other for said packing, the recess to accommodate the seal being formed in one flange while the recess for the packing being formed in the other flange. In order to transmit pressure from the medium to be sealed to said seal, the space of said recess accommodating the packing is connected above the level of the packing with said medium to be sealed by way of a bypass pipe.

With the seal and the packing being accommodated in separate recesses, the effect of repeated start-ups of the equipment on the degree of compression of said packing can be eliminated, a point to be elaborated hereinafter.

Yet another embodiment of the assembly in accordance with the invention, wherein the seal and the packing are accommodated in a single common recess formed in the lower flange, also permits eliminating the effect of repeated start-ups of the equipment for the case of a horizontal flanged joint. Said recess has a shoulder disposed on the side of higher pressure which broadens the upper portion of said recess. Said packing with said annular projection for compressing same are disposed in the narrow portion of said recess, whereas said seal is disposed above said shoulder in the broadened portion of said recess.

Still another embodiment of the assembly in accordance with the invention designed for use in flanged joints is characterized in that the end face of said annular projection for compressing the packing is provided with at least one closed annular tooth whereof the side surfaces are at right angles to the joint line of said flanges. This feature enables the flanges to be spaced slightly apart without causing a seal failure, since the contact of the packing with the tooth along the side surface is not broken when the flanges are drawn one from the other a small distance.

A further embodiment of the assembly of the invention provides for sealing the gaps between said projections for compressing said packing and the walls of the respective recess accommodating the packing, using a heat-resistant cord for the purpose. This feature permits reducing the stringency of the requirements to the size of said gaps which may be large enough to simplify the manufacturing and assembling procedures. The material from which said cord is made is selected from the group consisting of asbestos and soft metals such as copper, aluminum and the like.

The second above-mentioned important object of the invention, viz. keeping the assembly tight in spite of the latter's arbitrary orientation in space, is attained, in accordance with the invention, by providing the proposed sealed assembly with a means for compressing the seal, the latter being separated by at least one recess accommodating said packing from the lower-pressure medium and by at least one recess accommodating said packing from the higher-pressure medium, and said packing has capillaries of a larger effective diameter on the side of higher pressure than said packing has on the side of lower pressure.

Another embodiment of the assembly in accordance with the invention is represented by a sealed flanged joint allowing of an arbitrary spatial orientation. The assembly comprises one recess for the seal disposed in one of the flanges of said joint, two recesses for the fine-grained packing disposed in the other flange of said joint on both sides of said recess for the seal formed in the former flange, and annular projections equidistant with respect to these recesses, which are formed in the opposite flanges with a view to compressing said packing and said seal, the packing on the side of higher pressure having capillaries of a larger effective diameter than on the side of lower pressure.

The forced compression of the seal eliminates its free surface, enabling the position of the assembly in space to be changed without risk that said seal will escape from the gap being sealed towards the working space of the assembly. Said requirements to the effective diameter of the packing capillaries on the side of higher pressure provide for pressure stabilization in the seal irrespective of the degree of compression applied thereto, with a specified pressure differential between the seal and the medium being sealed, a point which will be covered in greater detail somewhat later.

Still another embodiment of the assembly in accordance with the invention relates to the sealing of an annular gap between two parts disposed one in the other and moving one with respect to the other. In this assembly, said seal and said fine-grained packing are accommodated in a common recess formed in the outer assembly component and opening into the gap to be sealed, whereas the means for compressing at least said packing is formed as a bush with a flange attached to said outer assembly component with the aid of fastening members.

In order to provide for more efficient compression of said packing in said recess formed in said outer assembly component, in yet another embodiment of the assembly in accordance with the invention said packing is disposed between metal rings installed with minimum clearances compatible with the assembling requirements with respect to the cooperating components executing motion one relative to the other.

A further embodiment of the assembly in accordance with the invention relates to the sealing of vertically positioned parts disposed one in the other and moving one with respect to the other. In this embodiment, the lower portion of the recess formed in the outer assembly component accommodates a sleeve open at the top and having an opening in the bottom thereof for the inner assembly component, with an annular lip solidly joined at the top thereof to said outer assembly component along the entire perimeter being loosely fitted into the upper portion of said sleeve to part of the latter's depth, and the seal is accommodated in the cavity defined by said sleeve and said lip while the packing is accommodated in the annular gap between said lip and the inner assembly component.

In order that in such an assembly the seal may not leak downwards towards the working medium, in another embodiment of the assembly in accordance with the invention, alongside said recess for the packing which is formed in said outer assembly component there is formed in the bottom of said sleeve a second recess opening into the gap to be sealed and disposed in concentric relationship therewith, said second recess serving to additionally accommodate said packing which is compressed by said bush with a flange.

The same effect is achieved in yet another embodiment of the assembly in accordance with the invention by solidly joining the bottom portion of said sleeve with said inner assembly component.

Still another embodiment of the assembly in accordance with the invention with the components disposed one in the other in movable relationship one with the other, permits of arbitrarily orienting the assembly in space. To this end, the seal is accommodated together with the packing in a common recess, the packing being disposed on both sides of the seal and separated therefrom on each side by said metal ring, so that the compressive force from said bush with a flange whereby the packing is compressed is transmitted to the seal. Such an arrangement reduces the effect of the seal on the degree of compression of the packing in the course of repeated start-ups of the equipment from a cold state as effectively as in the case where the seal and the packing are disposed in different recesses (flanged joints).

In order to minimize the degree of compression of the seal disposed between said rings in a common recess with the packing, spacers are installed between said rings to limit the minimum distance therebetween.

The third important object of the invention described hereabove, viz. to provide for a high level of assembly tightness at high speeds of relative motion of the components thereof (shaft rotation in a stationary housing), is attained in a further embodiment of the assembly in accordance with the invention. This latter embodiment of the assembly in accordance with the invention is characterized in that the site at which the gap being sealed between said assembly components opens into the environment is adjoined by an annular cavity filled with a liquid wetting the material of said packing, said cavity communicating by means of a channel via an electrically driven transfer pump and a check valve with said recess above the free surface of said seal on the side of the environment. Said liquid wetting the packing reduces the friction and heating of the layer of said packing which adjoins said rotating shaft, thereby preventing the formation in the packing of cracks wherethrough the seal may seep.

If the above-described type of assembly is to function normally, two free surfaces of the seal are needed, as noted hereabove, one said free surface experiencing the effect of the working medium being sealed while the other being exposed to the effect of said liquid on the side of the environment. Yet another embodiment of the assembly in accordance with the invention provides means for arranging said two surfaces as applied to a horizontally positioned rotating shaft. To this end, said recess formed in the outer assembly component comprises an annular lip disposed in the zone accommodating the seal and narrowing the space of said recess, while the upper portion of said recess on the side of the working medium communicates with the latter by means of a channel.

Still another embodiment of the assembly in accordance with the invention relates to a high-speed shaft rotating in a stationary housing. In this embodiment provision is made for automatically actuating said pump transferring said liquid wetting the packing. To this end, the starting circuit of said electric drive of the pump is coupled to a gage measuring the level of the packing on the side of the environment.

A further embodiment of the proposed assembly with a high-speed shaft rotating in a stationary housing incorporates means prventing the rotation of said shaft from being transmitted to the seal, e.g. radial fins installed in the seal zone.

The advantages of the present invention will be further disclosed in the following exemplary embodiments thereof described with reference to the accompanying drawings, wherein:

FIG. 1 is a longitudinal sectional view of an assembly sealed in accordance with the invention as applied to a stationary horizontal flanged joint, the left-hand portion of the drawing illustrating an embodiment wherein the working medium has a lower pressure than the environment, whereas the right-hand portion of the drawing showing an embodiment with an excessive pressure of the working medium with respect to the environment;

Figure 6:
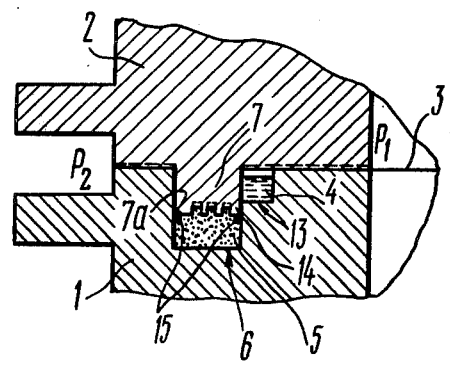
Figure 7:
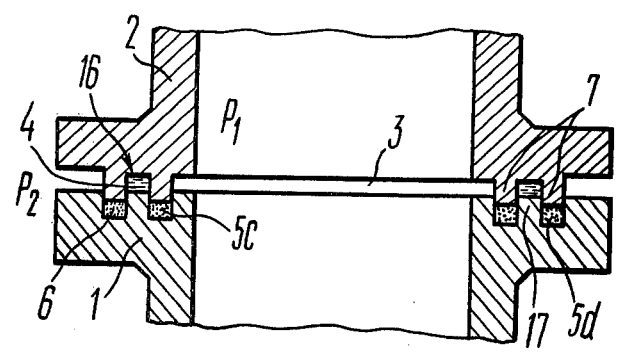
Figure 8:
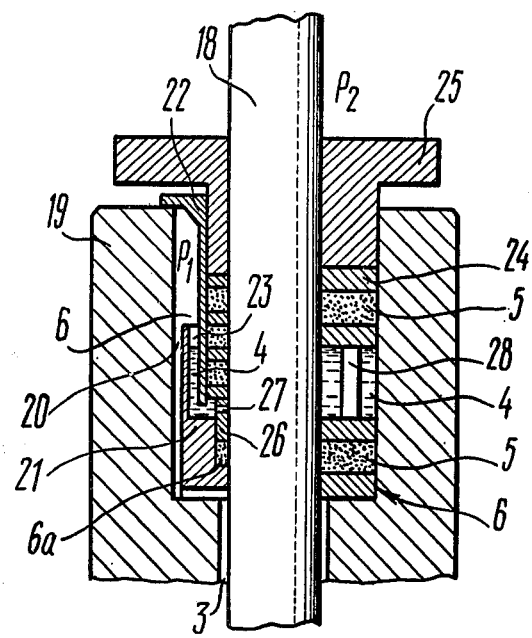
Figure 10:
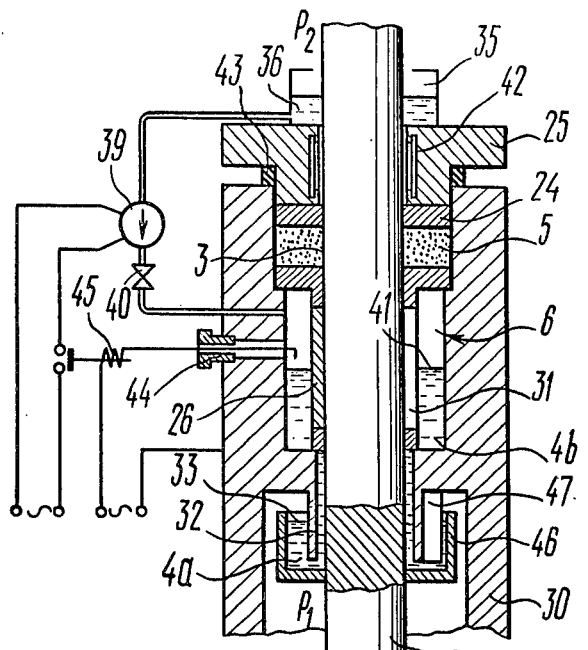
Figure 9:
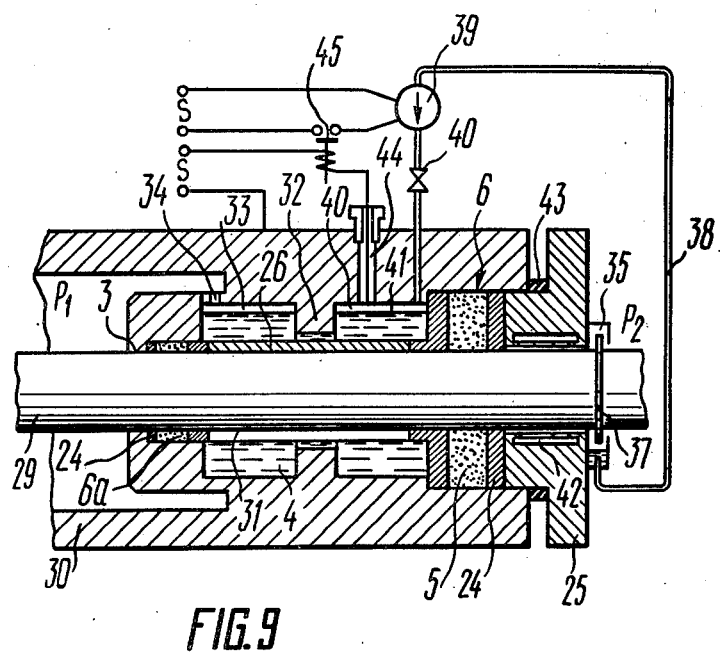

FIG. 6 ditto, with a multi-tooth projection;

FIG. 7 is a longitudinal sectional view of an assembly for sealing a flanged joint which, in accordance with the invention, allows of an arbitrary orientation in space;

FIG. 8 is a longitudinal sectional view of a sealed assembly with a movable rod in accordance with the invention, the left-hand portion of the drawing showing a vertical arrangement, while the right-hand portion depicting an arrangement with an arbitrary orientation in space;

FIG. 9 is a longitudinal sectional view of a sealed assembly with a high-speed horizontal shaft, in accordance with the invention; and FIG. 10 is a longitudinal sectional view of a sealed assembly for a high-speed vertical shaft, in accordance with the invention.

Referring now to the drawings, there is provided a sealed assembly made up of two cooperating parts 1 and 2 (FIGS. 1 to 7), 18 and 19 (FIG. 8), and 29 and 30 (FIGS. 9 and 10) with an annular gap 3 therebetween separating different-pressure media, which gap 3 is to be sealed.

The annular gap 3 accommodates a liquid seal 4 held by the surface tension forces with the aid of a lock. The lock has a polycapillary structure and is made of a material resistant to wetting by the seal 4.

In accordance with the invention, the lock is formed as a fine-grained packing 5 maintained in contact with the seal 4. To accommodate said packing 5, there is at least one recess 6 in concentric relationship with the gap 3 formed in one of the parts 1 or 2 (FIGS. 1 to 7), 19 (FIG. 8) and 30 (FIGS. 9 and 10). The assembly likewise comprises a means for compressing the packing 5 in the recesses 6.

The fine-grained packing 5 may be constituted by graphite powder.

In order to rule out any possibility of the graphite powder or any other fine-grained packing 5 being forced out of the gap 3 between the conjugated parts 1 and 2, 18 and 19 and 29 and 30 of the sealed assembly, in accordance with the invention, the packing 5 has a laminated structure.

The fine-grained packing 5 has at least two layers 5a (FIG. 2) and 5b, with the grain size progressively increasing from the layer 5a to the layer 5b from the medium with a higher pressure $P_1$ towards the medium with a lower pressure $P_2$.

Thus, for instance, the graphite grain size in the layer 5a may be on the order of 0.1 mm, while in the layer 5b on the order of 0.3 mm. The seal 4 is in contact with the layer 5a of the packing 5 having a smaller grain size providing for a sufficiently fine capillary structure, and on the side of the lower-pressure medium there is disposed the layer 5b of the packing 5 having a larger grain size sufficient to keep them in the gap 3 between said parts.

In accordance with the invention, he seal 4 may be constituted by heavy liquids, primarily low-melting metals and alloys which melt down under the heat effect of the working medium. e.g. tin, Wood's alloy and other low-melting metals.

Figure 1:
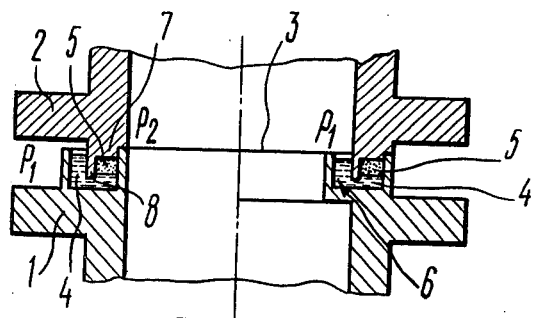

As can be seen in FIG. 1, the assembly sealed in accordance with the invention, as applied to a stationary horizontal flanged joint, is formed as two cooperating parts (two flanges) 1 and 2 with an annular gap 3 therebetween. In the lower flange 1 there is provided an annular recess 6 concentric with respect to the gap 3, said recess 6 accommodating a liquid seal 4 and a lock formed as a fine-grained packing 5 which are disposed in the recess 6 sequentiallly in a direction from the medium having a higher pressure $P_1$ toward the medium with a lower pressure $P_2$. The means for compressing the packing 5 is a projection 7 equidistant with respect to the recess 6, said projection 7 being formed in the upper flange 2. The recess 6 is wider than the projection 7, the latter adjoining by way of one side thereof the inner wall of the recess 6 on the side of the lower pressure $P_2$. The left-hand side of the drawing in FIG. 1 represents an embodiment wherein the working medium in the inner cavity of the joint being sealed has a lower pressure than the environment whereas the right-hand portion of that same drawing corresponds to an embodiment wherein said working medium is at a higher pressure than the environment.

On the other side of the projection 7 there is formed an annular lip 8, the packing 5 being disposed on the surface of the seal 4 in the portion of the recess 6 delimited by said lip 8 and the wall of said recess which faces towards the medium of the lower pressure $P_2$. The free surface of the seal 4 in the rest of the recess 6 lies above the lower edge of the lip 8, defining a hydraulic seal to prevent direct contact of the medium to be sealed with the packing 5.

In order to prevent the leakage of the medium being sealed at the sites where the packing 5 adjoins the walls of the assembly components 1 and 2, the surfaces of the latter should be non-wettable in the zone of contact with the packing 5, a conditions which can be satisfied either by selecting an appropriate material or by using appropriate coatings.

The packing 5 should be held fast between the cooperating assembly components so as to prevent the medium being sealed from leaking out through the loose sections of the structure as well as between the packing 5 and the walls of the recess 6. Besides, compression reduces the spacing of the grains making up the packing 5, causing its capillary structure to become finer (i.e. reducing the effective diameters of the capillary channels). Where graphite packing is employed, the density of the packing sufficient for providing for a pressure drop of the order of 20 to 25 megapascals is usually ensured by compressing the packing to about 60 or 70 percent of the depth of the recess 6 wherein it is disposed. Further compression of the packing 5 is limited by the height of the compressing projection 7 or by other known limiting means.

Figure 2:
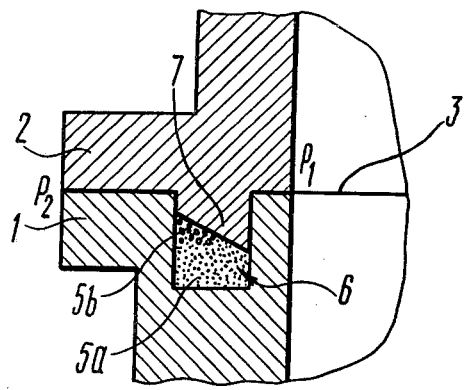
FIG. 2 is a scaled-up view of a portion of an assembly with a lock formed as a fine-grained packing which has, in accordance with the invention, two layers, with the grain size progressively increasing towards the environment (longitudinal section)
Figure 3:
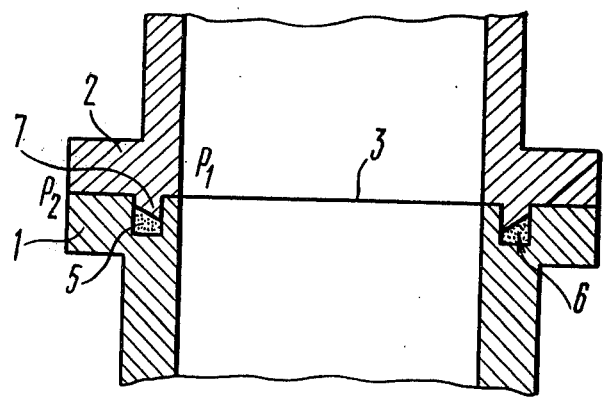
FIG. 3 is a longitudinal sectional view of a sealed assembly in accordance with the invention wherein the seal is constituted by a liquid working medium.

The simplest case of sealing assemblies by use of polycapillary lock means comprises combining same with the working medium of the seal 4, provided the latter does not wet the lock or the walls of the assembly components. Such a possibility presents itself, inter alia, when sealing the assemblies of the liquid-metal circuit equipment at nuclear power plants with fast reactors. FIGS. 2 and 3 illustrate a sealed assembly of a horizontal flanged joint as applied to the case in question. Here, the packing 5 is in direct contact with the liquid-metal working medium maintained at a pressure $P_1$.

However, water and water vapour, which have to be handled at high temprature and pressure values, constitute the most common working media at thermal and nuclear power plants as well as in other industries. Given the latter kinds of media, the most wide-spread materials are heat-resisting alloyed steels readily wettable by the working medium. Furthermore, no suitable non-wettable lock material has been found so far for such media. Consequently, an intermediate liquid seal 4 is required, such as could seal the working medium on the one hand, and could itself be sealed by the packing 5. It has already been mentioned that a suitable seal 4 for the above-stated conditions is constituted by molten tin, Wood's alloy and other low-melting metals.

When sealing assemblies in accordance with the principle described hereabove, one has to cope with an inherent difficulty which consists in that the once heat-resisting materials that go into the packing 5 are subject to lose, under the pressures of operating conditions, at least some of their original properties, with the result that the packing gets baked, springing leaks which cause a loss of sealing.

The sealing efficiency is improved and the above-mentioned deficiency remedied, in accordance with the present invention, by employing a heterogeneous diphase mixture of a liquid with a solid material wettable by said liquid as the seal 4. This makes for a far higher effective coefficient of surface tension in the seal 4 as against a purely liquid seal. Judging by the above-given formulas 2 and 3 which relate surface pressure to surface tension and capillary diameter, higher values of the effective surface tension allow of a corresponding increase in the permissible effective diameters of the capillary channels (pores) of the packing as well as in the size of the gaps between the packing and the walls of the assembly components, in turn contributing to the reliability of the sealing and enabling the required degree of compression of the packing to be reduced.

If molten tin or Wood's alloy are employed as the liquid phase of the seal, the solid phase may be constituted by bronze in the form of powder or sponge serving as an elastic framework holding the liquid phase of the sealing mixture.

Another difficulty consists in that the seals on the basis of low-melting metals become effective only upon melting, whereas the working medium in the equipment to be sealed, before attaining the nominal operating conditions, usually has a temperature below the melting point of the seal. Thus, while a nuclear power plant is brought to the operating mode, the temperature of 180° C.—the lowest melting point of lead-tin alloys—cannot be reached until after several hours of operation. The possible leakage of the medium in such a case may be prevented by selecting a material for the packing which, though unable to contain the medium being sealed at the operating parameters, could effectively contain it at lower parameters corresponding to the start-up and shut-down conditions. As applied to water, a suitable material is, e.g., the above-mentioned graphite powder which resists wetting by water up to the melting point of the seal.

The arrangement of the seal 4 and the packing 5 in a common recess 6, as shown in FIG. 1, involves some disadvantages. Thus, as noted hereabove, the packing 5 must be subjected to all-round compression if it is to be effective. A sealed assembly of a flanged joint is put together, in accordance with the invention, by successively placing the solid seal 4 and the packing 5 into the recess 6, whereupon the packing 5 is subjected to a required degree of compression with the aid of the annular projection 7 while the assembly components 1 and 2 are being joined. However, if the equipment is repeatedly started and shut down, with the seal 4 solidifying and remelting, the packing 5 is found to be non-compressed when the equipment is shut down, resulting in the threat of substantial leakage. For this reason, the assembly of such a type has to be reassembled at each start-up after the seal has solidified, so that it can only be recommended for continuously operating equipment.

Other design embodiments (FIGS. 4–10) allow of nullifying the effect of repeated start-ups of the equipment on the assembly sealing, which, in accordance with the invention, is attained by separating the seal from the packing so that the latter remains compressed whatever the operating mode. For such a case provision is made of separate annular cavities communicating via the gap 3, said cavities separately accommodating the seal 4 and the packing 5.

Figure 4:
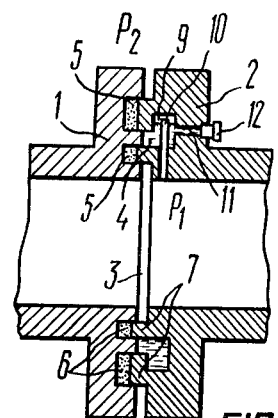
FIG. 4 illustrates a sealed assembly of a vertical flanged joint, wherein, in accordance with the invention, there are provided annular recesses for the packing and the seal separately.
Figure 5:
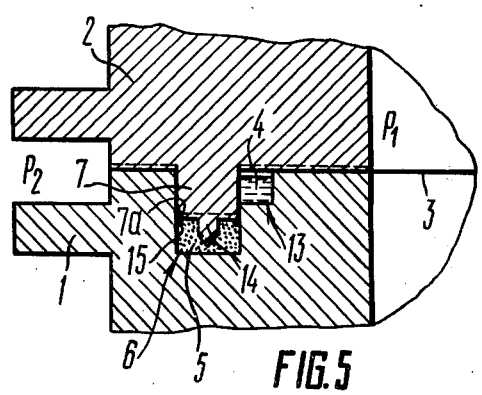
FIG. 5 is a longitudinal sectional view of a sealed assembly of a horizontal flanged joint, wherein, in accordance with the invention, the seal is disposed above the shoulder in the broadened portion of the recess formed in the lower flange and the single-tooth projection.

In FIGS. 4, 7 and 8, the annular cavities are represented by the separate recesses 6; while in FIGS. 5 and 6, the annular cavities are constituted by the narrow and broad portions of the recess 6.

Should the flanges be positioned vertically (FIG. 4), the packing 5 is accommodated in two recesses 6 formed in the flange 1, which recesses 6 are delimited by the respective projections 7 of the flange 2 on the side of the working medium and the environment. The seal 4 is accommodated in an additional stepped recess 9 formed in the flange 2 between the two projections 7 thereof in concentric relationship with the gap 3. A bypass pipe 10 serves to transmit the pressure of the working medium to the seal 4. The seal 4 is supplied and discharged via a channel 11 stoppered with a plug 12.

Should the flanges 1 and 2 be positioned horizontally, the seal 4 can be separated from the packing 5, in accordance with the invention, even if the two are accommodated in a common recess 6 (FIG. 5). To this end, the recess 6 has a shoulder 13 broadening its upper portion, said shoulder 13 being disposed on the side of the higher pressure $P_1$ (in this case, on the side of the working medium). The separation is achieved owing to the fact that the projection 7 and the packing 5 are disposed in the narrow portion of the recess 6 below the shoulder 13, whereas the seal 4 is accommodated in the broad portion of the recess 6 above the shoulder 13.

Originally, the seal 4 to be molten by the working medium is a metal ring. The original height of the packing 5 should be selected, with due regard for its compressibility, so that after the joint has been tightened the end face of the projection 7, and hence the final upper level of the packing 5, are positioned below the horizontal portion of the shoulder 13 carrying the ring of the seal 4.

The end face of the projection 7 of the assembly component 2, in accordance with the invention, has one (FIG. 5) or several (FIG. 6) teeth 14 with vertical side walls (perpendicular to the joint line) which prevent the medium being sealed and the molten seal 4 from leaking into the gap 3 above the packing 5 should the working medium pressure $P_1$ force the joint slightly open, e.g. due to slackening of the fastenings keeping the assembly components 1 and 2 together (shown in FIGS. 5 and 6 by the dotted line). The teeth 14 with vertical walls stop the gap 3 above the packing 5, which permits considerably reducing the preliminary effort needed to tighten the fastenings that has been shown experimentally to amount to 60 to 80 percent of the force mounted by the inner pressure of the medium being sealed. Sometimes, in order to simplify the manufacture and assembly of the joint, the clearance between the projection 7 of the assembly component 2 and the narrow portion of the recess 6 formed in the assembly component 1 is comparatively large (1 or 2 mm). In such a case cords 15 may be laid above the packing 5 at the vertical walls of the recess 6, said cords 15 being made of a heat-resisting material such as asbestos or a soft metal, e.g. copper or aluminium. The cord may be constituted by a metal line or a multiple-core cable. Chamfers 7a are formed in the projection 7 at the points of contact with the cord 15 so as to press the cord 15 against the vertical walls of the recess 6 in the assembly component 1.

The cords 15 prevent the packing 5 from being forced out of the clearances between the projection 7 and the recess 6.

In order that the sealed assembly may be arbitrarily oriented in space, with the free surface of the seal 4 eliminated, there are provided means (FIGS. 7 and 8—right-hand portion) for compressing the seal 4, and the seal 4 is separated by the recesses accommodating the packing 5 from both the high-pressure medium and the lower-pressure medium, the packing 5 on the side of the high pressure $P_1$ having larger effective diameters of the capillary channels than the packing 5 disposed in the recess on the side of the low pressure $P_2$.

Thus, for the flanged joint illustrated in FIG. 7, the recesses 6 for accommodating the packing 5 are formed in the flange 1, whereas to accommodate the seal 4 there is an additional concentric recess 16 formed in the other flange 2, said additional recess 16 being separated by the recess 6 with the packing 5c from the high-pressure medium and by the recess 6 with the packing 5d from the low-pressure medium. The packing 5c on the side of the high pressure $P_1$ has larger effective diameters of the capillary channels than the packing 5d on the side of the low pressure $P_2$. The means for compressing the seal 4 in the recess 16 and the packing 5c and 5d in the recesses 6 are formed as projections 17 and 7 formed in the flanges 1 and 2 opposite to the recesses, the projections 17 and 7 being equidistant with respect to the recesses 6. The packing 5c on the side of the medium with the high pressure $P_1$ serves a different function from the packing 5d disposed on the side of the medium with the low pressure $P_2$; the former is not used as a locking element but rather as a means for raising the pressure in the seal 4 as against the working medium. A minimum pressure differential between the seal and the medium being sealed is mandatory, for otherwise the medium being sealed will be able to break through the seal to the lock (packing 5), inevitably resulting in leaks. If the packing is disposed in front of the seal, the higher pressure in the latter arises due to the surface pressure exerted on the seal in the capillaries. Since the pressure in the seal—excessive with respect to the medium being sealed—may be kept at a minimum, the effective diameters of the pores in this packing may be far larger than those of the packing placed behind the seal where the surface pressure must contain the pressure of the medium being sealed added to the excessive pressure in the seal (see the relationships between the capillary diameter, the meniscus pressure and the surface tension given in FIGS. 2 and 3).

A sealed assembly made up of movable components which execute relative motion at a comparatively small speed, e.g. a rod assembly, is illustrated in FIG. 8, the left-hand part of the drawing showing a design adapted to a vertical position of the rod in space, whereas the right-hand part corresponds to an arbitrary position of the rod in space.

The assembly comprises an inner component—a rod 18 (FIG. 8)—moved with respect to a stationary component—a housing 19—wherein there is formed a recess 6 open with respect to the rod 18.

If the assembly is positioned vertically, the lower portion of the recess 6 accommodates a sleeve 21 open at the top and having a hole in the bottom thereof for the rod 18, the sleeve 21 being installed with a clearance 20 with respect to the recess 6. An annular lip 22 is loosely fitted into the sleeve 21 from above to a certain depth thereof, the annular lip 22 being solidly joined, e.g. by welding, to the housing 19 in the upper portion of the lip along the entire perimeter. The seal 4 is disposed in an annular cavity 23 open at the top and defined by the sleeve 20 and the lip 21, whereas the packing 5 is disposed between metal rings 24 in the annular gap defined by the lip 21 and the rod 18. The same gap receives a flanged press bush 25 designed to compress the packing 5, the press bush 25 being fitted into said gap from above. The press bush 25 is attached to the housing 19 by means of fastenings (not shown in the drawing).

Under the lower level of the cavity 23 an annular recess 6a is formed in the bottom portion of the sleeve 21 adjoining the rod 18, said annular recess 6a being designed to additionally accommodate the fine-grained packing 5 which prevents the seal 4 from leaking downwards along the rod 18 and into the cavity being sealed. In order to compress said packing 5, there is provided an intermediate press bush 26 having side openings 27 whereby the seal 4 is connected with the gap 3. Instead of being provided with the additional recess 6a, the sleeve 21 may be solidly joined by way of the bottom portion thereof to the rod 18.

If the rod 18 is arbitrarily oriented in space, as shown in FIG. 8 in the right-hand part of the drawing, the cavity 23 for the seal 4 is formed by placing spacers 27 between the two metal rings 24, said spacers 27 limiting the minimum distance therebetween. The fine-grained packing 5 is disposed on both sides of the cavity 23 between the rings 24, the effective diameters of the capillary channels of the packing 5 being larger on the side of the working medium being sealed which has the pressure $P_1$ and smaller on the side of the environment with the pressure $P_2$.

A special problem is presented by the sealing of assemblies wherein the components execute relative motion at a high speed, inter alia, high-speed shafts. The difficulty here consists in that as a result of the shaft play the surface layer of the packing which adjoins the shaft loses its elastic properties, giving rise to a gap between the shaft and the packing. Means to combat this undesirable effect are illustrated in FIGS. 9 and 10 for a horizontal and vertical position of the rotating shaft, respectively.

Just as in FIG. 8, the assembly comprises a movable component—a shaft 29—which rotates with respect to a stationary housing 30. Along the gap 3 between the shaft 29 and the housing 30 there is provided an annular recess 6 filled with a liquid seal 4 and a packing 5 placed across the path of motion of the seal 4, the packing 5 being delimited on both sides by metal guide rings 24. The packing 5 is compressed by means of a flanged press bush 25 via an intermediate press bush 26 having longitudinal notches 31 which prevent the seal 4 from being involved by the shaft 29 in the act of rotation.

For the case of a horizontally positioned shaft 29 (FIG. 9), the recess 6 for the seal 4 has a centrally disposed annular lip 32 for creating a hydraulic seal with two communicating portions of the sealing liquid 4 and separated levels on the side of the working medium and the environment. The pressure $P_1$ of the working medium being sealed is transmitted to the table of level 33 of the left-hand (as seen in the drawing) portion of the seal 4 via an opening 34.

At the point where the gap 3 between the shaft 29 and the housing 39 opens into the environment, in accordance with the invention, there is provided an annular cavity 35 filled with liquid 36 wetting the material of the packing 5. At the section of the shaft 29 inside the cavity 35 there is installed a guard ring 37 which prevents the liquid 36 from leaking out of the cavity 35. The lower portion of the cavity 35 is connected by a channel 38 via an electric transfer pump 39 and a check valve 40 with the space above level 41 of the right-hand (as seen in the drawing) portion of the seal 4. To cool the liquid 36, the press bush 25 incorporates an inner cooler, e.g. an annular conduit 42 wherethrough a circulating coolant is passed. Leakage of the liquid 36 is prevented by use of a common sealing, e.g. a gasket 43.

The starting circuit of the electric drive (not shown in the drawing) of the pump 39 is coupled to a level gauge 41 sensing the level of the seal 4 on the side of the environment.

The level gauge is formed as an electric contact 44 coupled into the winding of a relay 45 whose normally open contacts control the circuit supplying the electric motor of the pump 39.

If the shaft 29 is vertically positioned (FIG. 10), the seal 4 has two portions, an upper portion 4b and a lower portion 4a. The lower portion 4a is disposed in an annular bath 46 open at the top wherein there are installed radial fins 47 which prevent transmission of rotation from the shaft 29 to the seal 4 in the same way as the notches 31 in the bush 26 do.

As has been earlier mentioned, the liquid 36 is pumped from the cavity 35 by the pump 39 into the space above the level 41 of the seal 4 on the side of the environment with the pressure $P_2$. The pressure mounted by the pump 39 must exceed the pressure in the seal 4 so that the seal 4 is pressed back by the liquid 36 and the level 41 of the seal 4 on the side of the environment goes down until the contact 44 is left bare, opening the supply circuit of the electric drive of the pump 39.

The pressure transmitted by the working medium to the seal 4 through the table of the level 33 causes the liquid 36 capable of wetting the packing 5 to seep into the gap 3 between the shaft 29 and the packing 5, reducing the friction of and cooling the surface layer of the packing 5 adjoining the shaft 29 and thereby preventing the cracking of the packing 5. From the viewpoint of friction recution, the liquid 36 should desirably combine wetting ability with good lubricating properties. The liquid 36 may be constituted, for instance, by natural mineral oils, synthetic fire-resistant liquids employed in steam turbine control systems, and the like.

While being disposed between the seal 4 and the packing 5, the liquid 36 also serves as an intermediate seal which is not locked by the packing 5 but freely passes therethrough, being drawn into the circulation circuit with the aid of the electric pump 39.

When the shaft 29 does not rotate, the electric pump 39 may be switched off, with the liquid 36 being forced into the cavity 35 and the seal 4 coming into contact with the packing 5, so that the earlier described basic principle of the sealing arrangement comes into effect.

The examples given hereabove are mere illustrations of the essence of the invention, it being clearly understood that other embodiments thereof are possible within the framework of the claims listed hereinbelow.

What is claimed is:

1. A sealed assembly, comprising two cooperating components with an annular gap therebetween separating different pressure media; at least one recess formed in at least one of said assembly components, opening into said gap and disposed in concentric relationship therewith; a liquid seal accommodated in one of said recesses comprising a heterogeneous diphase mixture of a molten material selected from the group which consists of tin and Wood's alloy with a solid material having a fine-grained structure and lending itself to wetting by said melt; a polycapillary locking element formed as a fine-grained packing contacting said seal and accommodated in at least one of said recesses at least on the side of the medium having a lower pressure with respect to said seal, said seal and said assembly components at least at the site of contact therewith being constructed from a material resistant to wetting by said seal to hold same in said gap by the surface tension forces; and means for compressing at least said packing in said recesses.

2. A sealed assembly as set forth in claim 1, wherein said solid material comprises bronze.

* * * * *